Patented Feb. 20, 1940

2,191,231

UNITED STATES PATENT OFFICE 2,191,231

NEGATIVE ELECTRODE FOR LEAD-ACID STORAGE BATTERIES AND METHOD OF PRODUCING THE SAME

Anna P. Hauel, New York, N. Y.

No Drawing. Application April 4, 1939,
Serial No. 265,901

17 Claims. (Cl. 136—26)

My invention relates to the manufacture of storage battery electrodes, and more particularly to the manufacture of negative electrodes, or spongy-lead electrodes for lead acid type storage batteries, and has for its object to provide a negative electrode and a method for manufacturing the same, which electrode as compared with electrodes previously manufactured will have its active material in such a condition of particle subdivision and physical structure as to yield markedly increased initial capacity and to maintain that increased yield longer during the use of the electrode than has heretofore been possible.

My invention consists in the preparation of a barium compound and the incorporation of this compound into the active paste or material to be made active in a lead acid storage battery electrode either prior to or after incorporation into the storage battery grid and which will be adsorbed on the surface of the lead compound particles to produce what I call protective action by preventing the growth of large metallic lead crystals or particles and producing on formation spongy lead particles which are submicroscopic in size, thereby increasing tremendously the specific surface of the active material in the electrode as compared with the active material of plates made from the same lead compound or compounds but without my barium compound.

My invention is based upon the discovery that the active material of negative storage battery electrodes can be given increased active surface by the addition to the active material of substantially colloidal barium sulphate as expander. I propose the use of this expander as I have found that barium sulphate in substantially colloidal state increases tremendously the specific surface of the active material in the electrodes as compared with the active material of plates made from the same lead compound or compounds but using barium sulphate in substantially crystalline state as expander. Colloidal barium sulphate prevents as expander the growth of large metallic lead crystals or particles and produces on formation spongy lead particles which are submicroscopic in size.

In accordance with my present invention a paste is used for lead acid storage battery electrodes, said paste having as expander substantially colloidal barium sulphate or a substantially colloidal barium sulphate-containing product incorporated therein. According to a preferred embodiment of my invention a relatively small proportion, between one twentieth of one percent and one percent by weight is evenly distributed throughout the paste.

If an oxide of lead is used for the paste having a high content of metallic lead the use of substantially colloidal barium sulphate as expander is particularly advantageous as barium sulphate in crystalline state as usually used cannot prevent the growth of large lead crystals or particles in electrodes having high content of metallic lead.

It is well known to use as expander besides sulphates of alkaline earth metals various organic compounds and lamp black in substantially colloidal state. A further embodiment of my invention consists in using a paste having distributed therethrough two or more expanders, one consisting of substantially colloidal barium sulphate and the other consisting of lampblack and or of an organic substance elected from the group of organic compounds usually used as organic expanders. These organic compounds and or lampblack may be adsorbed on the active surface of said substantially colloidal barium sulphate particles.

The process of making a paste according to my invention comprises adding to a lead compound for lead acid storage battery electrodes as expanders substantially colloidal barium sulphate or a solution or dispersion containing said sulphate.

It has been found that it is difficult to add to or to form in the lead compounds to be used for the paste barium sulphate in a substantially colloidal state. It is a further important object of my invention to solve this problem: I propose to carry out this process by reacting a barium compound selected from the group of barium sulphides, barium oxides and barium hydroxides in solid or highly concentrated state with sulphuric acid forming thereby a substantially colloidal barium sulphate containing dispersion and adding said dispersion to a lead compound for lead acid storage battery electrodes as expander. It is evident that as dispersion may also be used a solution or suspension containing barium sulphate in substantially colloidal state.

The same effect can be obtained by mixing lead compounds with a relatively small amount of a solid or highly concentrated barium compound selected from the group of barium sulphides, barium oxides and barium hydroxides, and adding to this mixture a solution containing sulphuric acid, hereby reacting said barium compound with said sulphuric acid and forming substantially colloidal barium sulphate, said colloidal barium sulphate substantially evenly distributed in said active lead compound.

In all these various embodiments of my invention it is important to quickly react the solid or highly concentrated barium compound selected from the group of barium sulphides, barium oxides, and barium hydroxides with sulphuric acid, as by a very quick reaction barium sulphate in substantially coloidal state is formed. It is further important not to dry especially not to dry by heating the precipitated substantially colloidal barium sulphate before adding to the lead compounds. By a quick drying or glowing process the colloidal barium sulphate particles crystallize and accordingly crystalline barium sulphate is formed which has not the advantages of the colloidal barium sulphate.

In order to produce a paste containing as expanders organic compounds as well as barium sulphate in a colloidal state I prefer to add the expanders in a solution containing substantially colloidal barium sulphate and an organic expander adsorbed by said substantially colloidal barium sulphate particles. The process may be carried out by adding sulphuric acid to a solution or disperson of organic substances selected from the group of organic compounds used usually as organic expanders and thereafter adding to the solution or disperson a solid or highly concentrated barium compound selected from the group of barium sulphides, barium oxides, and barium hydroxides, particularly adding solid barium oxide. Thereby, the barium compound reacts with the sulphuric acid and in the solution or dispersion of the organic compounds substantially colloidal barium sulphate is formed, adsorbing the organic substances in the solution. Thereafter, the solution containing substantially colloidal barium sulphate and said adsorbed organic substances as expanders is mixed with lead compounds which thus form a paste for lead acid storage battery electrodes.

My new process may be performed in the following manner:

1. A saturated aqueous solution of barium rhodanide $Ba(SCN)_2$ and mangan sulphate $MnSO_4$ are mixed in the proportion of their molecular weight without heating the solution. Thereby a gel-like colloidal barium sulphate is formed which is freed from the electrolytes by dialysis. Thereafter the gel-like mass is used as expander and mixed in a known manner with lead compounds, aqueous sulphuric acid and, if desired, also with lampblack and organic expanders for the manufacture of active material for negative electrodes.

2. 1 750 cubic centimeters aqueous solution of sulphuric acid having a specific gravity of 1.160 are mixed with 70 grams of solid barium sulphide. By reacting the barium sulphide with the sulphuric acid substantially colloidal barium sulphate is formed in the solution. The solution containing now substantially colloidal barium sulphate in suspension is allowed to stand for several hours as to allow the formed hydrogen sulphide to escape. Thereafter, the solution containing substantially colloidal barium sulphate in suspension is mixed with 10 kilograms of litharge and the mixture is used as paste for the manufacture of negative electrodes by filling the same into grids or the like.

3. A solution of an organic substance selected from the group of organic compounds usually used as organic expander, e. g. 3 grams of lignin are dissolved in 1500 cubic centimeters of water containing 2 grams of sodium hydroxide in order to promote the dissolution of the lignin in the water. To the thus formed solution 300 grams of concentrated sulphuric acid having a specific gravity of 1.840 are added and thereafter mixed with 70 grams of solid barium oxide. By reacting said barium oxide with said sulphuric acid substantially colloidal barium sulphate is formed in the solution. Thereby, the organic expanders are adsorbed by the colloidal barium sulphate. Thereafter, the solution containing as expanders substantially colloidal barium sulphate and the organic substance adsorbed by said substantially colloidal barium sulphate is mixed with 10 kilograms of litharge and the thus obtained mixture is used as paste for the manufacture of negative electrodes by filling the same into grids or the like.

4. A solution of an organic substance selected from the group of organic compounds usually used as organic expanders, e. g. 3 grams of lignin are dissolved in 100 cubic centimeters of water containing 2 grams of sodium hydroxide in order to promote the dissolution of the lignin in the water. To the thus formed solution 10 grams of concentrated sulphuric acid having a specific gravity of 1.840 are added and thereafter mixed with 70 grams of solid barium oxide. By reacting the barium oxide with the sulphuric acid substantially colloidal barium sulphate is formed in the solution. Thereby, the organic expanders are adsorbed by the colloidal barium sulphate. Then the excess liquid is removed from the solution in any known manner till a paste remains containing substantially only barium sulphate in a substantially colloidal state and organic expanders adsorbed on the surface of the colloidal barium sulphate particles. The liquid is removed without excess of heat thereby keeping the barium sulphate in its substantially colloidal state. Thereafter the thus formed expander paste is added to the active material e. g. to a mixture of 10 kilograms lead compounds and 1 750 cubic centimeters aqueous solution of sulphuric acid having a specific gravity of 1.160 said mixture being prepared in the usual manner. The expander paste is mixed with and thus evenly distributed throughout the active material and the thus obtained mixture used as paste for the manufacture of negative electrodes.

Although the disclosure of the above is that of the preferred embodiments, it will be readily understood that the invention is susceptible to considerable modification and change and comprehends other details and procedures without departing from the spirit of the invention defined in the following claims.

What I claim as my invention is:

1. A paste for lead acid storage battery electrodes having incorporated therein substantially colloidal sulphate of barium, the particles of said substantially colloidal barium sulphate adsorbed on the surface of the lead compound particles of the paste, said barium sulphate produced by reacting a barium compound selected from the group consisting of barium sulphides, barium oxides and barium hydroxides in solid or pasty state with sulphuric acid.

2. A paste for lead acid storage battery electrodes having evenly distributed therethrough a relatively small proportion of substantially colloidal barium sulphate, the particles of said substantially colloidal barium sulphate adsorbed on the surface of the lead compound particles of the paste, said barium sulphate produced by reacting a barium compound selected from the group consisting of barium sulphides, barium oxides and barium hydroxides in solid or pasty state with sulphuric acid.

3. A paste for lead acid storage battery electrodes consisting of an oxide of lead with high content of metallic lead having incorporated therein substantially colloidal sulphate of barium, the particles of said substantially colloidal barium sulphate adsorbed on the surface of the lead compound particles of the paste, said barium sulphate produced by reacting a barium compound selected from the group consisting of barium sulphides, barium oxides and barium hydroxides in solid or pasty state with sulphuric acid.

4. A paste for lead acid storage battery electrodes consisting of a lead paste having distributed therein between one twentieth of one percent and one percent by weight of substantially colloidal barium sulphate, the particles of said substantially colloidal barium sulphate adsorbed on the surface of the lead compound particles of the paste, said barium sulphate produced by reacting a barium compound selected from the group consisting of barium sulphides, barium oxides and barium hydroxides in solid or pasty state with sulphuric acid.

5. A paste for lead acid storage battery electrodes having distributed therethrough expanders one consisting of substantially colloidal sulphate of barium, the particles of said substantially colloidal barium sulphate adsorbed on the surface of the lead compound particles of the paste, said barium sulphate produced by reacting a barium compound selected from the group consisting of barium sulphides, barium oxides and barium hydroxides in solid or pasty state with sulphuric acid and the other consisting of lampblack and of an organic expander, said lampblack and said organic expander adsorbed on the active surface of said substantially colloidal barium sulphate particles.

6. A paste for lead acid storage battery electrodes having distributed therethrough two expanders one consisting of substantially colloidal sulphate of barium, the particles of said substantially colloidal barium sulphate adsorbed on the surface of the lead compound particles of the paste, said barium sulphate produced by reacting a barium compound selected from the group consisting of barium sulphides, barium oxides and barium hydroxides in solid or pasty state with sulphuric acid and the other consisting of lampblack, said lampblack adsorbed on the active surface of said substantially colloidal barium sulphate particles.

7. A paste for lead acid storage battery electrodes having distributed therethrough two expanders one consisting of substantially colloidal sulphate of barium, the particles of said substantially colloidal barium sulphate adsorbed on the surface of the lead compound particles of the paste, said barium sulphate produced by reacting a barium compound selected from the group consisting of barium sulphides, barium oxides and barium hydroxides in solid or pasty state with sulphuric acid and the other consisting of an organic expander, said organic expander adsorbed on the active surface of said substantially colloidal sulphate particles.

8. A lead acid storage battery electrode having an inert metal grid filled with an active lead mass containing substantially evenly distributed therein as expander barium sulphate in substantially colloidal state, the particles of said substantially colloidal barium sulphate adsorbed on the surface of the lead compound particles of the paste, said barium sulphate produced by reacting a barium compound selected from the group consisting of barium sulphides, barium oxides and barium hydroxides in solid or pasty state with sulphuric acid.

9. The process of making paste for storage batteries which comprises adding to a lead compound for lead acid storage battery electrodes as expander substantially colloidal barium sulphate produced by reacting a barium compound selected from the group consisting of barium sulphides, barium oxides and barium hydroxides in solid or highly concentrated state with sulphuric acid.

10. The process of making paste for storage batteries which comprises adding to a lead compound for lead acid storage battery electrodes as expander a solution containing substantially colloidal barium sulphate produced by reacting a barium compound selected from the group consisting of barium sulphides, barium oxides and barium hydroxides in solid or highly concentrated state with sulphuric acid.

11. The process of making paste for storage batteries which comprises reacting a barium compound selected from the group consisting of barium sulphides, barium oxides and barium hydroxides in solid or pasty state with sulphuric acid, forming hereby a substantially colloidal barium sulphate-containing dispersion, and adding this dispersion to a lead compound for acid storage battery electrodes as expander.

12. The process of making paste for storage batteries which comprises reacting a barium compound selected from the group consisting of barium sulphides, barium oxides and barium hydroxides in solid or pasty state with sulphuric acid, forming hereby a substantially colloidal barium sulphate containing solution, and adding this suspension or solution as expander to a lead compound for lead acid storage battery electrodes.

13. The process of making a paste for lead acid storage battery electrodes which comprises mixing lead compounds with a relatively small amount of a solid or pasty barium compound selected from the group consisting of barium sulphides, barium oxides and barium hydroxides, and adding to this mixture a solution containing sulphuric acid, hereby reacting said solid or highly concentrated barium compound with said sulphuric acid and forming substantially colloidal barium sulphate, said colloidal barium sulphate substantially evenly distributed in said active lead compound.

14. The process of making paste for storage batteries which comprises adding to a lead compound for lead acid storage battery electrodes as expander a solution containing substantially colloidal barium sulphate produced by reacting a barium compound selected from the group consisting of barium sulphides, barium oxides and barium hydroxides in solid or highly concentrated state with sulphuric acid and an organic expander adsorbed on the surface of said substantially colloidal barium sulphate.

15. The process of making a paste for lead acid storage battery electrodes, which comprises adding to a solution or dispersion of an organic expander sulphuric acid adding hereafter to this solution a solid or pasty barium compound, selected from the group of barium sulphides, barium oxides and barium hydroxides, reacting hereby said barium compound with said sulphuric acid and forming hereby in the solution of organic expanders substantially colloidal barium sulphate, said substantially colloidal barium sulphate adsorbing the organic substances contained in said organic expander, mixing hereafter the solution containing said substantially colloidal barium sulphates and said adsorbed organic substances as expanders with lead compounds forming hereby a paste for lead acid storage battery electrodes.

16. The process of making a paste for lead acid storage battery electrodes, which comprises adding to a solution or dispersion of an organic expander sulphuric acid adding thereafter to this solution solid barium oxide reacting thereby said barium oxide with said sulphuric acid and forming in the solution of organic expanders substantially colloidal barium sulphate, said substantially colloidal barium sulphate adsorbing the organic substances contained in said organic expanders, mixing thereafter the solution containing said substantially colloidal barium sulphate and said adsorbed organic substances as expanders with lead compounds forming thereby a paste for lead acid storage battery electrodes.

17. In a paste for lead-acid storage battery electrodes an expander containing substantially colloidal barium sulphate, the particles of said substantially colloidal barium sulphate produced by reacting a barium compound selected from the group consisting of barium sulphides, barium oxides and barium hydroxides in solid or pasty state with sulphuric acid.

ANNA P. HAUEL.